United States Patent Office 3,293,037
Patented Dec. 20, 1966

3,293,037
COMPOSITIONS OF MATTER COMPRISING INORGANIC PHOTOCHROMIC MATERIAL DISPERSED IN AN AMINOPLAST RESIN
John A. Chopoorian, Stamford, Conn., assignor to American Cyanamid Company, Stamford, Conn., a corporation of Maine
No Drawing. Filed Nov. 21, 1962, Ser. No. 239,323
13 Claims. (Cl. 96—90)

This invention relates to novel compositions of matter. More particularly, this invention relates to novel compositions of matter comprising aminoplast resins having uniformly dispersed throughout the body thereof, an inorganic photochromic material. Still more particularly, this invention relates to novel compositions of matter comprising aminoplast resins having uniformly dispersed throughout the body thereof, a photochromic material comprising various inorganic metal oxides.

Photochromic materials are known and have been used as the active ingredients in such articles as data storage devices, reflectants for incident high-intensity radiation, photochemical printing and the like. There has, however, to my knowledge been no disclosure of the production of compositions of matter comprising highly stable, very sensitive, rapid color-changing photochromic materials uniformly dispersed throughout various aminoplast resins.

I have now discovered that certain metal oxide photochromic materials may be directly and uniformly incorporated into various aminoplast resins, in particular, the aminotriazine-aldehyde resins such as melamine-formaldehyde reaction products by either (1) conducting the aminoplast resin formation in the presence of the photochromic material or (2) physically blending or admixing the aminoplast resin in, e.g., powder form with the photochromic material, such as by the use of a three-roll mill. It was indeed surprising and unexpected to find that the photochromic inorganic oxides still functioned as efficiently in the solid resin binder as in the solid uncombined state. It is well known that many solid inorganic photochromic materials which change their color in the solid state, do not continue to function as photochromic materials after having been dispersed throughout a solid binder. For example, $TiO_2$ doped with an iron oxide, functions as a photochromic material in the pure solid state, however, upon incorporation thereof into a solid glass binder, will not change color upon contact with ultraviolet rays.

However, I have discovered novel compositions of matter comprising various aminoplast resins containing certain inorganic metal oxides, in uniform molecular distribution, which continue to function as photochromic materials upon contact with irradiation, i.e., ultraviolet light. These novel compositions thereby permit the temporary recording of data, images or designs and the production of various articles heretofore not possible utilizing prior art products. Additionally, the products are produced in an easily-handled state.

The prior art devices of this type present many deficiencies and problems which have heretofore been very difficult to overcome. In regard to various commercially available storage devices and photographic instruments for instance, the light sensitive material must be prevented from coming into contact with white light, such as by storage in the dark or by coating the material with a protective film, such as a gel or tin foil etc. The compositions of my invention, however, need only be removed from the light a short time before use in order to be transformed back to their original color if they previously have come into contact with ultraviolet light. Additionally, these prior art devices decompose rapidly because of their relatively poor stability and therefore must be used within a certain date after their manufacture. However, the novel compositions of matter of the present invention are very stable, easily handled, can be stored for extended periods of time without fear of damage by white light and still possess all the properties necessary and desired for the above-enumerated uses.

The novel compositions of my invention are moldable, castable etc., by all known techniques into discs, plates, films, foils and the like. Since the color change of the photochromic compounds, more fully discussed hereinbelow, is evident in the solid state in admixture with the aminoplast resins, the necessity of laminated construction and/or encapsulation and their accompanying disadvantages in the use of other photochromic materials have been obviated by my novel compositions.

It is an object of the present invention to provide novel compositions of matter.

It is a further object of the present invention to provide novel compositions of matter comprising aminoplast resins having uniformly dispersed throughout the body thereof, an inorganic photochromic material.

It is a further object of the present invention to provide novel compositions of matter comprising aminoplast resins, in particular, amino-triazine-aldehyde resins such as melamine-formaldehyde resins, having uniformly dispersed therethrough, a photochromic material comprising various inorganic metal oxides.

These and other objects will become more apparent to those skilled in the art upon reading the more detailed description of my invention set forth hereinbelow.

As mentioned above, molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation the absorption spectrum for the system changes drastically, but when the irradiation source is removed the system reverts to its original state.

Photochromism has been observed in inorganic and organic compounds both in solution and solid state. Although the exact mechanism of color change varies in each individual system, in many inorganic systems it can be related to one of two possible reaction schemes. The first process is the alteration of the force field around the nucleus of a coordination compound by photo-initiated dissociation, ligand exchange, or isomerization. This alteration can lead to a marked change in the light absorption properties of a molecule.

The second fundamental photo-electronic mechanism generally considered as producing photochromism is electron delocalization. This mechanism is rapidly reversible in organic molecules and therefore usually produces no colored intermediate. However, in inorganic crystals, photoinitiated electron delocalization from an impurity can lead to a colored state in which the electron is either trapped by a crystal defect to form a color center or otherwise reacts with the crystal host to leave the system in a colored state.

There are three major factors which govern the behavior of a photochromic system.

A.—ABSORPTION OF INCIDENT RADIATION

According to the quantum theory, each absorbed quantum creates one activated molecule and only absorbed radiation can produce a chemical change. Variables which control the number of photons absorbed include the concentration and extinction coefficient of the photochrome, the screening coefficients of other components of the system, and the wavelengths of the incident radiation.

B.—QUANTUM YIELD

All excited molecules will not undergo transformation to the colored form, so that the quantum yield will generally be less than unity. Various deactivating processes which compete for the excited molecules include fluorescence, phosphorescence, permanent chemical change and thermal release.

C.—THE REVERSE REACTION

In both the forward and reverse reactions, the concentration of the colored form is dependent on the intensity of the radiation, the kinetics of the reverse reactions, and temperature of the reactions. The kinetics for the reverse reaction will normally be controlling, however some reverse reactions are thermally sensitive and are accelerated by irradiation or heating.

By the terms "photochromic compound," "photochromic substance" or "photochromic material," as used in the instant disclosure, is meant compounds, substances or materials which change their transmission or reflectance upon being subjected to ultraviolet or visible irradiation and subsequently revert to their original state upon subjection thereof to a different wavelength of radiation, or removal of the initial ultraviolet source.

The ability of various materials to change color and to then revert back to their original color is not a new phenomena. In fact, such compounds have been widely used in various ways, as described above. Generally, these compounds change their color when exposed to ordinary sunlight and revert back to their original color upon removal thereof from the rays of the sun. Various other materials however, change color only when subjected to a certain degree of irradiation, and as such, sunlight will not effect them. High intensity radiation, such as 10–25 cal./cm.$^2$/sec. or more is necessary in regard to these compounds, while sunlight (0.2 cal./cm.$^2$/sec.) will affect the former.

I have discovered a group of photochromic materials which may be incorporated into aminoplast resins, especially the aminotriazine-aldehyde resins, thereby forming the novel compositions of the present invention having the several advantages mentioned above.

These photochromic materials are admixtures of inorganic metal oxides. The admixtures generally consist of a primary or host inorganic metal oxide doped with a lesser or contaminating amount of another guest inorganic metal oxide. The admixtures which are contemplated as useful in the novel compositions of my invention are the following: $TiO_2$ doped with $Fe_2O_3$, FeO, $Cr_2O_3$, CuO, NiO, $MnO_2$ or $Mn_2O_3$; $Nb_2O_5$ doped with $Fe_2O_3$, FeO, $Cr_2O_3$, CuO, $V_2O_5$, $MnO_2$ or $Mn_2O_5$; $Al_2O_3$ doped with $Cr_2O_3$ or $V_2O_5$; ZnO doped with CuO or $V_2O_5$; $SnO_2$ doped with CuO; or $ZrO_2$ doped with CuO or NiO. In regard to the $TiO_2$, the rutile form of the compound is sufficient, however, the anatase form containing at least 5% of the rutile material is preferred. These admixtures contain from about 0.01 to 5.0 mole percent of the doping guest oxide, preferably 0.1 to 2.0 mole percent, based on the number of moles of the host oxide.

These doped oxides are well known in the art and generally may be prepared by any applicable method. Various methods which may be used include those set out in the following articles. Williamson, Nature (London) 140, 238 (1937); McTaggert et al., J. Appl. Chem., 5, 643 (1955); Frydryck, Doctoral Thesis, Free University of Berlin (1961), and additionally the method set forth hereinbelow.

I have also discovered a second group of photochromic materials that may be employed in the present invention. The second group comprises admixtures of $TiO_2$ with a combination of two doping (guest) metal oxides. I have found that these mixtures of guest oxides, in admixture with $TiO_2$, exhibit a more pronounced effect in the color intensity of the products than either doping metal (guest) oxide used alone. For example, $TiO_2$ doped with $Fe_2O_3$ or FeO and NiO or $TiO_2$ doped with $Fe_2O_3$ or FeO and CuO result in a more intense color change than $TiO_2$ doped with $Fe_2O_3$, FeO, NiO or CuO, alone. That is to say, a synergistic effect is observed wherein the results obtained utilizing a mixture of guest oxides is better than that obtained from either guest oxide alone or the mere additive results of both together. Here, again, the rutile form of the host compound is satisfactory, but the anatase form containing at least 5% of the rutile material is preferred. When a combination of the different doping oxides are used, amounts ranging from 100:1 to 10:1, preferably 25:1 to 5:1, of the iron oxide to the nickel or copper oxide are satisfactory, the total amount of the mixed oxides still however, being within the range (in mole percent) specified above.

These admixtures of host and guest oxides, either, as such, or with combinations of doping guest oxides, may be prepared, among other methods, by slurrying a solution of the doping metal oxide salt, the guest metal oxide itself, or mixtures thereof, with the host metal oxide. The slurry is evaporated and ground, then calcined at a temperature between 400° C. and 1100° C. to give the active admixture. In the case of $TiO_2$, the host crystalline compound desired can be previously prepared, or starting the admixture preparation with anatase, the desired final proportion of rutile can be controlled by the length of time the admixture is calcined above the phase transition temperature, ca. 800° C.) The final active admixtures are not merely mechanical or physical blends, but are crystalline materials consisting of a host material matrix wherein is contained substitutionally or interstitially, the doping guest metal oxide.

I have also discovered another group of photochromic inorganic oxide admixtures which may be used in the compositions of the present invention. This third class of materials, in order of preference, is $TiO_2$ in admixture with $MoO_3$ or $WO_3$. These admixtures are produced in mole ratios of about 1 to 15 mole percent of $TiO_2$ to about 25 to 1 mole percent of $MoO_3$ or $WO_3$. The preferred mole ratios range from about 1:4 to about 12:1, respectively. The $TiO_2$ component may be in either the rutile, anatase, or mixed phase form, and in place of $TiO_2$ other metal oxide components may be used, such as, for example, ZnO, $ZrO_2$, $SnO_2$ or $GeO_2$ in the same mole ratio given above for $TiO_2$.

These two phase materials constituting the third class of photochromic materials are novel compounds and are prepared as described and claimed in copending application, Serial No. 239,151, filed concurrently herewith. In a typical procedure, the compounds are prepared by dissolving the $MoO_3$ or $WO_3$ in an aqueous basic solution and adding to this solution an acidified aqueous slurry or solution of the primary metal oxide component. After heating at up at 100° C. for several hours or longer, the desired active material is formed in very high yield, separated from the solvent, washed free of acid and dried.

Superficially taken, it would appear that the third class of materials are merely a mechanical or physical mixture of the two oxide components. However, these latter chemically prepared, coprecipitated materials are of extremely great photo-sensitivity in comparison to a mixture of their individual metal oxides. Additionally, X-ray evidence clearly indicates that the crystalline matrix of the $MoO_3$ or $WO_3$ has been completely altered. Although not wishing to be bound by any particular theory, it is possible that this phenomena can be explained as follows. Since the photochromic color in these compounds is deep blue, the most likely theoretical alternatives as to the nature of this photochromic reaction is that a net electron delocalization to Mo or W takes place either by an inter- or intra-phase photoinitiated electron transfer from the second component of the active material. Because of the degradation of these Mo and W compounds at higher temperatures, it is preferred that the aminoplast resins containing them be cast instead of molded, however, molding them is possible, although somewhat less practical than casting.

The amount of the inorganic metal oxide (photochromic material), in any instance, incorporated into the aminoplast resins is not critical and depends materially upon the intensity of the color of the composition desired upon irradiation thereof. Generally, however, it is necessary to incorporate at least about 1.0% and usually up to about 70%, by weight, of the photochromic material into the polymer, based on the weight of the resinous polymer. It is preferred, however, that more than 20%, by weight, of the photochromic material be added.

The aminoplast resins employed in the practice of the present invention are synthetic resins prepared by the condensation reaction of an amino (including imino) or amido (including imido) compound with an aldehyde. Resinous condensates of this type, as well as methods for their preparation, have been shown innumerable times in the prior art, and adequate disclosures of them may be found in, for example, U.S. Patents Nos. 2,197,357; 2,310,004 and 2,328,592 to Widmer et al. and 2,260,239 to Talbot. The present invention is concerned particularly with aminoplast resins of the type wherein one or more aminotriazines containing at least two amidogen groups, each having at least one aldehyde-reactable hydrogen atom attached to the amidogen nitrogen atom, e.g., melamine have been reacted with an aldehyde, such as formaldehyde, to yield a thermosetting resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are used in the practice of the present invention, but other aminotriazines, e.g., mono-, di- and tri-substituted melamines, such as the mono-, di- and tri-methylmelamines, and the like; guanamines, such as formoguanamine, acetoguanamine, benzoguanamine, and the like, as well as mixtures of aminotriazines, may be utilized as reactants. Similarly, formaldehyde, preferably in aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine and the like, may also be employed. The properties desired in the finished product and economic considerations are among the elements which will determine the choice of the particular aminotriazine and aldehyde employed.

The mol ratio of aldehyde to aminotriazine in such resinous reaction products is not critical, and may be within the order of from about 1.5:1 to about 4:1, respectively, depending on the nature of the starting materials and the characteristics desired in the final product, but it is preferred that the mol ratio be within the order of from about 2:1 to about 3:1, respectively.

Conventional reaction conditions are observed in preparing the aminotriazine-aldehyde resins, i.e., the aldehyde and aminotriazine may be heat-reacted at temperatures ranging from about 40° C. to reflux temperature, i.e., about 100° C., for periods of time ranging from about 30 to 120 minutes, at a pH ranging from about 7.0 to 10, preferably in an aqueous medium. Any substance yielding acidic or alkaline aqueous solutions may be used to regulate the pH, for example, alkaline materials such as alkali metal or alkaline earth metal oxides, e.g., sodium, potassium or calcium hydroxide or sodium or potassium carbonate; mono-, di- or tri-alkylamines, e.g., ethanolamine, triethylamine or triethanolamine; alkylene polyamines or polyalkylene polyamines, e.g., 3,3'-iminobispropylamine, and the like.

I may also employ other amido or imido compounds having at least two aldehyde-reactable hydrogen atoms attached to amidogen nitrogen atoms besides the aminotriazines in preparing the aminoplast resins used in the present invention. For example, I may employ urea and those of its derivatives which have been commonly used in the preparation of aminoplast resinous compositions, such as for example the alkylureas, e.g., mono- and dimethylurea, halourea, and the like.

The properties of the thermosetting aminoplast resins can be further modified, if desired, by incorporating various other substances into the aminotriazine-aldehyde resin. Included among such substances are plasticizers such as the α-alkyl-D-glucosides, e.g., α-methyl-D-glucoside, disclosed in U.S. Patent No. 2,773,848 to Lindenfelser, methylol derivatives corresponding to the general formula:

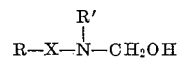

wherein R represents an alkyl, aryl or aralkyl group, R' represents a hydrogen atom or an alkyl, alkylol, aryl or acyl group, and X represents —SO$_2$— or —C—, e.g., N-methylol p-toluenesulfonamide (which may be formed in situ by the addition of p-toluene sulfonamide to an amidogen-formaldehyde reaction mixture) and the like, or combinations of these glucosides and methylol derivatives, e.g., a mixture of α-methyl-D-glucoside and p-toluenesulfonamide, as disclosed in U.S. Patent No. 2,773,788 to Magrane et al.

As mentioned above, the photochromic material may be incorporated into the aminoplast resin during the production thereof. When such a method of incorporation is employed it is necessary to control the condensation reaction employed. That is to say, the exact process used is governed by the photochromic compound which will be incorporated into the resulting product. A process must be selected which does not require the use of any material, substance, compound or condition which will neutralize or react with the photochromic material, thereby nullifying its ability to reversibly change color. Therefore, any material, in predominant excess, such as an acid may not be used during the condensation reaction in this method of incorporation of the photochromic material.

The same limitations of procedure must also be placed upon the physical blending techniques when the photochromic material is blended with the thermosetting aminoplast resin utilizing various devices to admix the resin and the photochromic compounds, as such.

When physical blending of the aminoplast resin and photochromic substance is desired, known procedures such as utilizing a ball mill, a tumbler mixer, hot rolls, emulsion blending techniques, Banbury mixers, Waring Blendors and the like are effective. Another procedure which may be employed is known as a devolatilization-extrusion method, wherein separate streams of solutions of the aminoplast resin and photochromic material are subjected to mixing, compounding, devolatilization and extrusion in commercially available devices. In the devolatilizer-extruder, the mixture is worked in a chamber under heat and vacuum so that new surfaces of the aminoplast resin mixture are continuously and rapidly exposed to vacuum to remove the solvent before extruding the product. The term "devolatilization," as herein employed, refers to the step in which the non-resinous volatile material is removed from the solution of the polymer. The apparatus which simultaneously devolatilizes and extrudes the material comprises a chamber with one or more screws having a close tolerance with the wall for compounding the material in its passage therethrough, and at least one vacuum chamber for removing the volatile components of the feed. The action of working the material under the close tolerance of the screws not only intimately blends the mixture, but generates substantial heat which aids in the devolatilizing of the blend.

The devolatilizer-extruder may contain one of more interconnected sections, at least one being under vacuum. A preferred treatment wherein the material is worked for a total time of from about 1 to 5 minutes, employs two vacuum sections. In addition to the vacuum sections, the devolatilizer-extruder may contain a section following the vacuum sections which is atmospheric, i.e. not under vacuum, wherein various volatiles or non-volatile modifiers, fillers, lubricants, stabilizers, plasticizers, colorants or the like, may be incorporated into the novel compositions of this invention and extruder therewith.

The vacuum sections of the devolatilizer-extruder are heated to temperatures of from about 110° C. to 245° C. and maintained under vacuum at an absolute pressure of from about 5 mm. to about 200 mm. mercury. Preferably, the temperature of the sectionally heated apparatus is maintained at from about 160° C. to about 210° C. and the vacuum is preferably maintained at from about 5 mm. to 90 mm. mercury absolute pressure. As the two streams are introduced into the devolatilizer-extruder the increased temperature causes volatilization of the solvent therefrom. At the same time, because the extruder is maintained at subatmospheric pressures, the volatile material is withdrawn or volatilized from solutions of polymer and photochromic material.

A preferred group of compositions of matter of the present invention consists of the above-identified aminoplast resins in admixture with photochromic compounds wherein the resin has been incompletely condensed, i.e., is thermosetting. In this instance, the thermosetting resin is used and a final composition is produced which may be subsequently cured, i.e., completely condensed by the ultimate consumer into any desired end product. Therefore, the thermosetting resin containing the photochromic material may be cast, molded, etc. to form various articles the shape, size and form thereof being that required by the user.

Formed articles, i.e., molding, castings, etc., prepared from the novel compositions of the present invention can be prepared by any known techniques. One technique which is well known, economic and very efficient, and therefore probably preferred, follows.

The aminoplast resinous molding materials may be prepared by first impregnating a fibrous filler, such as chopped α-cellulose, with a thermosetting aminoplast resin, containing the benzospiropyran photochromic compound, in syrup form, drying the impregnated material to a low volatile content, usually in the order of about 10% or less, converting the dried material to a fine, fluffy powder while blending it with various commonly employed additives, such as curing catalysts, pigments, mold lubricants, and the like, and finally densifying and granulating the powdered molding composition, thus converting it to a form especially suited for commercial molding techniques.

In such techniques, the common practice is to first shape the granular molding composition into a preformed article which approximates the shape the article will assume in its final form. This preforming step may be carried out either in a press or mold specifically designed for preforming or in a conventional molding press, either with or without the application of heat, to result in a preformed article whose resin content either remains uncured or becomes only partially cured, thus providing for the subsequent application of a decorative overlay, if desired. Decorative overlays comprising a single sheet or foil of high grade α-cellulose paper or similar fibrous material impregnated with a thermosetting aminoplast resin are usually employed to provide a decorative effect to relatively flat molded pieces, such as dinner plates, saucers, and the like, and are ordinarily not used with deep-draw molded articles such as cups, bowls, and the like. The preformed article is of a somewhat porous nature, and should contain slightly more resinous material than will be retained by the article when it assumes its final molded form. This is to insure that the mold used in the final molding operation will be substantially filled, with the usual provision being made for a small amount of flashing.

Ordinarily, the preformed article, either with or without a decorative overlay, is then placed in a molding press and molded, under suitable conditions of heat and pressure, to its final molded form.

By utilizing this type of procedure such articles as dinnerware, containers, memory devices such as analogue computers, temporary oscillographs, wall switches, optical masks, wall panels, window display cases and the like may be produced, which articles effectively and dramatically change their color upon contact with ultraviolet light, and revert to their original color upon removal of the light source.

The compositions of the present invention may further be modified by the addition of such materials as fillers, lubricants, plasticizers, colorants, etc., as mentioned above. It is also possible to lengthen the life of the compositions by incorporating various amounts of ultraviolet light absorbers into them or by coating the articles formed from the compositions, with a material containing an ultraviolet light absorber. When additives such as these are added, any conventional compound known to function as a UV absorber may be employed. Examples of such compounds are the 2-hydroxy benzophenones, e.g., 2,4-di-hydroxy benzophenone; the 2(2-hydroxyphenyl)benzotriazoles, e.g., 2(2-hydroxy-4-methoxyphenyl)benzotriazole and the like. In this manner, the photochromic life of the photochromic inorganic oxide additive is lengthened by preventing an extraneous amount of ultraviolet light from coming into contact with the photochromic material. When absorbers of this type are added, amounts of up to about 20%, by weight, based on the weight of the polymer, may be used.

The following examples are set forth for purposes of illustration only and are not to be construed as limitations on the present invention except as set forth in the appended claims. All parts and percentages are by weight unless otherwise noted.

*Example 1*

A powdered, commercially available, spray dried melamine resin (mole ratio of formaldehyde to melamine of 2:1), 100 parts, and 20 parts of a singly doped metal oxide, $TiO_2$ activated by 0.2% $Fe_2O_3$, by weight, are added to a ball mill. The ingredients are allowed to thoroughly mix for 1 hour. The resultant intimately combined mixture is placed into a pre-heated saucer-shaped mold and heated to 155° C. for five minutes. A molded saucer is produced which changes color from off-white to tan upon contact with ultraviolet light of 350 m$\mu$ wavelength.

*Example 2*

To 100 parts of the same melamine-formaldehyde resin as described in Example 1, are added 25 parts of a doubly doped metal oxide, $TiO_2$ doped with 0.2% $Fe_2O_3$ and 0.02% $CuO$, by weight. The components are thoroughly admixed in a tumbler-type mixer and the resultant admixture is then placed in a pre-heated cup-shaped mold and heated to 170° C. for about 5 minutes. The recovered molded cup turns a deep tan color when subjected to ultraviolet light and reverts to its original off-white color when removed therefrom.

*Example 3*

Into a suitable reaction vessel are added melamine and formaldehyde in a mole ratio of formaldehyde to melamine of 2:1. An aqueous solution of sodium carbonate is added to adjust the pH of the reaction media to 8.7. The vessel is heated to 85° C. and 45 parts, by weight, based on the weight of melamine and formaldehyde, of $TiO_2 \cdot 12WO_3$ (produced by reacting one mole of $TiO_2$ with 12 moles of $WO_3$) are added. The vessel is then heated to 95° C., with stirring, for one hour. An aminoplast resin is recovered by conventional spray drying, granulated and molded at 160° C. for 5 minutes in a preheated mold. The molded article produced is subjected to ultraviolet light of 400 m$\mu$ wavelength and changes color to a blue-green very rapidly.

Example 4

Following the procedure of Example 1, a molded saucer is produced from the resin described therein containing 20 parts, by weight, of $TiO_2$ activated with 0.2% FeO and 0.02% Ni, by weight. The saucer turns deep tan upon contact with ulltraviolet light.

Example 5

Again following the procedure of Example 1, a saucer is produced from the resin described therein containing 28.5 parts, by weight, of $TiO_2 \cdot 6MoO_3$ (produced by reacting one mole of $TiO_2$ with 6 moles of $MoO_3$). The saucer turns deep blue when subjected to ultraviolet light.

Following the procedure of Example 1, various other photochromic inorganic oxide materials are added to the commercially available melamine-formaldehyde resin. In Examples 6 to 11 and 15 to 28, amounts corresponding to those of Example 1 were used, however in Examples 12 to 14, Examples 2 and 4 were followed in regard to photochromic concentration. Examples 29 to 33 followed Example 3 in this respect and Examples 34 to 37 followed Example 5. The results of these experiments are set forth in Table I below.

TABLE I

| Example | Activated With— | Color Change | Time Activation, Sec. |
|---|---|---|---|
| 6 | $TiO_2$+FeO | Off-white to tan | 60 |
| 7 | $TiO_2$+$Cr_2O_3$ | Off-white to light tan | 1,800 |
| 8 | $TiO_2$+CuO | do | 120 |
| 9 | $TiO_2$+NiO | do | 120 |
| 10 | $TiO_2$+$MnO_2$ | do | 100 |
| 11 | $TiO_2$+$Mn_2O_5$ | do | 100 |
| 12 | $TiO_2$+$Fe_2O_3$+NiO | Off-white to deep tan | 60 |
| 13 | $TiO_2$+FeO+NiO | do | 60 |
| 14 | $TiO_2$+FeO+CuO | Off-white to brown | 60 |
| 15 | $Nb_2O_5$+$Fe_2O_5$ | Off-white to grey | 1,200 |
| 16 | $Nb_2O_5$+FeO | do | 1,200 |
| 17 | $Nb_2O_5$+$Cr_2O_3$ | do | 2,400 |
| 18 | $Nb_2O_5$+CuO | do | 1,400 |
| 19 | $Nb_2O_5$+$V_2O_5$ | do | 2,400 |
| 20 | $Nb_2O_5$+$MnO_2$ | do | 1,500 |
| 21 | $Nb_2O_5$+$Mn_2O_5$ | do | 1,500 |
| 22 | $Al_2O_3$+$Cr_2O_3$ | do | 3,600 |
| 23 | $Al_2O_3$+$V_2O_5$ | do | 3,600 |
| 24 | ZnO+CuO | do | 2,700 |
| 25 | ZnO+$V_2O_5$ | do | 2,700 |
| 26 | $SnO_2$+CuO | Off-white to deep tan | 2,700 |
| 27 | $ZrO_2$+CuO | Off-white to grey | 2,700 |
| 28 | $ZrO_2$+NiO | do | 2,700 |
| 29 | $TiO_2 \cdot WO_3$ | Faint yellow to blud-green | 60 |
| 30 | $TiO_2 \cdot WO_3$ | Faint yellow to deep blue-green | 300 |
| 31 | $ZnO \cdot MoO_3$ | White to light blue / White to blue | 60 / 300 |
| 32 | $ZrO_2 \cdot MoO_3$ | White to light blue / White to blue | 60 / 300 |
| 33 | $ZrO_2 \cdot WO_3$ | Faint yellow to light blue-green | 60 |
| 34 | $SnO_2 \cdot MoO_3$ | White to light blue / White to blue | 60 / 300 |
| 35 | $SnO_2 \cdot WO_3$ | Faint yellow to light blue-green | 60 |
| 36 | $GeO_2 \cdot WO_3$ | do | 60 |
| 37 | $GeO_2 \cdot MoO_3$ | White to light blue / White to blue | 60 / 300 |

I claim:

1. A composition of matter comprising an aminoplast resin having uniformly dispersed throughout the body thereof an inorganic photochromic material selected from the group consisting of (A) $TiO_2$ doped with an oxide selected from the group consisting of $Fe_2O_3$, FeO, $Cr_2O_3$, CuO, $MnO_2$, $Mn_2O_3$, a mixture of $Fe_2O_3$ and NiO, a mixture of $Fe_2O_3$ and CuO, a mixture of FeO and NiO and a mixture of FeO and CuO, (B) $Nb_2O_5$ doped with an oxide selected from the group consisting of $Fe_2O_3$, FeO, $Cr_2O_3$, CuO, $V_2O_5$, $MnO_2$, and $Mn_2O_5$, (C) $Al_2O_3$ doped with an oxide selected from the group consisting of $Cr_2O_3$ and $V_2O_5$, (D) ZnO doped with an oxide selected from the group consisting of CuO and $V_2O_5$, (E) $SnO_2$ doped with CuO, (F) $ZrO_2$ doped with an oxide selected from the group consisting of CuO and NiO, (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZoO_3$ reacted with an oxide selected from the group consisting of $MoO_3$ and $WO_3$, (J) $SnO_2$ reacted with an oxide selected from the group consisting of $MoO_3$ and $WO_3$ and (K) $GeO_2$ reacted with an oxide selected from the group consisting of $MoO_3$ and $WO_3$.

2. A composition according to claim 1 containing, in addition to the inorganic photochromic material, an ultraviolet light absorber.

3. A composition of matter comprising an aminoplast resin having uniformly dispersed throughout the body thereof an inorganic photochromic material selected from the group consisting of (A) $TiO_2$ doped with an oxide selected from the group consisting of $Fe_2O_3$, FeO, $Cr_2O_3$, CuO, NiO, $MnO_2$ and $Mn_2O_3$, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$, and $V_2O_5$, (D) ZnO doped with an oxide selected from the group consisting of CuO and $V_2O_5$, (E) $SnO_2$ doped with CuO, and (F) $ZrO_2$ doped with an oxide selected from the group consisting of CuO and NiO.

4. A composition of matter comprising an aminoplast resin having uniformly dispersed throughout the body thereof an inorganic photochromic material selected from the group consisting of (G) $TiO_2$ reacted with an oxide selected from the group consisting of $MoO_3$, and $WO_3$, (H) ZnO reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_3$ and $WO_3$ and (K) $GeO_2$ reacted with an oxide selected from the group consisting of $MoO_3$ and $WO_3$.

5. A composition of matter comprising an aminoplast resin having uniformly dispersed throughout the body thereof an inorganic photochromic material selected from the group consisting of (a) $TiO_2$ doped with a mixture of $Fe_2O_3$ and NiO, (b) $TiO_2$ doped with a mixture of $Fe_2O_3$ and CuO, (c) $TiO_2$ doped with a mixture of FeO and NiO and (d) $TiO_2$ doped with a mixture of FeO and CuO.

6. A composition according to claim 1 wherein the aminoplast resin is a melamine-formaldehyde resin having a mole ratio of formaldehyde to melamine of from about 1.5:1 to about 4:1.

7. A composition according to claim 3 wherein the aminoplast resin is a melamine-formaldehyde resin having a mole ratio of formaldehyde to melamine of from about 1.5:1 to about 4:1.

8. A composition according to claim 4 wherein the aminoplast resin is a melamine-formaldehyde resin having a mole ratio of formaldehyde to melamine of from about 1.5:1 to about 4:1.

9. A composition according to claim 5 wherein the aminoplast resin is a melamine-formaldehyde resin having a mole ratio of formaldehyde to melamine of from about 1.5:1 to about 4:1.

10. A composition according to claim 1 wherein the aminoplast resin is a thermosetting aminotriazine-aldehyde resin.

11. A composition according to claim 3 wherein the aminoplast resin is a thermosetting aminotriazine-aldehyde resin.

12. A composition according to claim 4 wherein the aminoplast resin is a thermosetting aminotriazine-aldehyde resin.

13. A composition according to claim 5 wherein the aminoplast resin is a thermosetting aminotriazine-aldehyde resin.

References Cited by the Examiner

UNITED STATES PATENTS

| | | | |
|---|---|---|---|
| 1,934,451 | 11/1933 | Sheppard et al. | 96—88 |
| 2,119,189 | 5/1938 | Widmer. | |
| 2,515,938 | 7/1950 | Stookey | 96—88 |
| 2,809,954 | 10/1957 | Kazenas | 252—301.2 |
| 2,851,424 | 9/1958 | Switzer et al. | 252—301.2 |
| 2,959,481 | 11/1960 | Kucera | 96—1 |
| 2,964,666 | 12/1960 | Klasens et al. | 313—108 |
| 3,035,966 | 5/1962 | Siuta. | |
| 3,037,951 | 6/1962 | Basto et al. | 260—39 X |
| 3,077,398 | 2/1963 | Jones | 96—1 |
| 3,113,117 | 12/1963 | Gosselink et al. | 260—39 X |
| 3,121,006 | 2/1964 | Middleton et al. | 96—1 |
| 3,214,283 | 10/1965 | Chopoorian | 106—300 X |

OTHER REFERENCES

Dana: "Textbook of Minerology," 4th ed., J. Wiley, 1932, 498–500 and 680–1 relied on.

NORMAN G. TORCHIN, *Primary Examiner.*

A. L. LIBERMAN, D. D. PRICE, *Assistant Examiners.*